United States Patent [19]

Park et al.

[11] Patent Number: 5,592,235

[45] Date of Patent: Jan. 7, 1997

[54] TERRESTRIAL/CABLE BROADCASTING SIGNAL RECEIVER FOR HDTV

[75] Inventors: Heebok Park; Jong-Seok Park, both of Kyungki-do, Rep. of Korea

[73] Assignee: LG Electronics Inc., Seoul, Rep. of Korea

[21] Appl. No.: 420,199

[22] Filed: Apr. 11, 1995

[30] Foreign Application Priority Data

Apr. 12, 1994 [KR] Rep. of Korea .................... 7624/1994

[51] Int. Cl.$^6$ .................................................. H04N 5/46
[52] U.S. Cl. ............................................. 348/555; 348/554
[58] Field of Search ....................................... 348/553, 554, 348/555, 558

[56] References Cited

U.S. PATENT DOCUMENTS 5,418,815  4/1995  Ishikawa et al. ..................... 375/216

Primary Examiner—Victor R. Kostak
Assistant Examiner—Nathan J. Flynn
Attorney, Agent, or Firm—John P. White

[57] ABSTRACT

A ground/cable broadcasting receiver for an HDTV for receiving both ground and cable channel broadcastings of an HDTV is disclosed including: switching means for selecting ground broadcasting or cable broadcasting; a TCM decoder for symbol-detecting and error-correcting a baseband signal of the ground broadcasting for HDTV; discriminating means for symbol-detecting a baseband signal of the HDTV cable broadcasting; and a multiplexer for selecting and outputting one of the signals output from the TCM decoder and the discriminating means according to the switching means so that ground broadcasting receiver and cable broadcasting receiver are coupled to form a single receiver.

8 Claims, 4 Drawing Sheets

TERRESTRIAL/CABLE BROADCASTING SIGNAL RECEIVER FOR HDTV

BACKGROUND OF THE INVENTION

The present invention relates to a terrestrial/cable broadcasting receiver for receiving a signal transmitted via a terrestrial or cable broadcasting channel through one receiver in a high definition television (HDTV).

The U.S. HDTV transmission method, which is divided into terrestrial broadcasting and cable broadcasting, was determined by Grand Alliance. For terrestrial broadcasting, the 8-vestigial side band (VSB) the number of whose symbol level is eight, was selected. For cable broadcasting, 16-VSB the number of whose symbol level is sixteen was chosen.

However, the terrestrial broadcasting and cable broadcasting are different in transmission method. 8-VSB, which is for terrestrial broadcasting, transmits one program within 6 MHz, 16-VSB sending two programs within 6 MHz.

In terrestrial broadcasting, a broadcasting signal is transmitted via free spaces as a medium so that it is exposed to various noises present in the spaces and its attenuation becomes severe. Especially, there is created common-channel interference or nearby-channel interference by broadcasting signals emitted from nearby broadcasting stations.

The common-channel interference by an NTSC broadcasting station is hard to control with a general band-limiting filter. For this reason, only an NTSC carrier is removed by using an NTSC rejection filter, which, however, causes a slight damage in an intended signal.

A multipath interference, which is caused when a broadcasting signal is mixed with the same signal reflected by high objects such as mountains and buildings, is removed by a highly-integrated channel equalizing filter. Accordingly, the terrestrial broadcasting uses a very complicated receiver, and is difficult to transmit at a high data rate.

Meanwhile, in the cable broadcasting, a signal is transmitted through a coaxial cable so that there is present the nearby-channel interference due to nearby-frequency-band transmission data. However, there is no common-channel interference. Therefore, the NTSC rejection filter which damages an intended signal is unnecessary for the cable broadcasting.

In addition, since the cable broadcasting has no multipath interference, a channel equalizing filter can be employed, which compensates only for linear distortion produced in a transmission/reception device and is simple in construction, and has a fast convergence velocity.

Furthermore, since random noise is seldom mixed in the cable channel, unlike the terrestrial channel, the cable broadcasting makes high-level symbol transmission possible.

Although the terrestrial channel transmits only two-bit data for every symbol, the cable channel can transmit four-bit data for every symbol so that two programs are transmitted within 6 MHz.

In order to increase immunity from random noise, the terrestrial channel uses the Trellis coded modulation (TCM) with complicated hardware in detecting a signal. However, even without the TCM the cable channel has a high immunity from random noise so that signal detection can be performed with a discriminator which is simple in hardware.

As discussed above, the terrestrial broadcasting receiver and cable broadcasting receiver are different in configuration, respectively shown in FIGS. 1 and 2.

FIG. 1 is a block diagram of a conventional terrestrial broadcasting receiver for HDTV, with FIG. 2 showing a conventional cable broadcasting receiver for HDTV.

The conventional terrestrial broadcasting receiver for HDTV comprises an antenna 1, tuner 2, channel selector 3, IF filter/sync detector 4, sync extractor 5, NTSC rejection filter 6, NTSC interference discriminator 8, multiplexer 9, channel equalizer 10, phase tracker 11, TCM decoder 12, data deinterleaver 13, R-S decoder 14, and data derandomer 15.

The operation of the terrestrial broadcasting receiver will be explained below.

A signal input via antenna 1 is converted into an IF signal in tuner 2 according to a channel selected by channel selector 3.

The thus converted IF signal is changed into a form suitable for detection in IF filter/sync detector 4, and becomes a baseband signal. In sync detection, a carrier extracted in sync extractor 5 is used.

The baseband signal output from IF filter/sync detector 4 passes through NTSC rejection filter 6 when NTSC interference discriminator 8 detects that there is NTSC interference. When there is no NTSC interference, the baseband signal is directly output not via NTSC rejection filter 6. For this selection, multiplexer 9 is used which is switched under the control of NTSC interference discriminator 8.

For the terrestrial broadcasting output from multiplexer 9, multipath noise is fatal to signal detection. Therefore, in order to cancel ghost error due to multipath, the terrestrial broadcasting is channel-equalized in channel equalizer 10 using a highly integrated filter of large number of filter taps. However, the large number of filter taps increases the convergence time of channel equalizer 10, lengthening the stabilization time of the whole system accordingly.

In restoring the carrier for sync detection of sync detector 5, the phase may deviate slightly. Phase tracker 11 finely adjusts the deviating phase of the signal formed after the channel equalization in channel equalizer 10.

After the phase tracking, the baseband signal output from phase tracker 11 is symbol-detected through TCM decoder 12. TCM decoder 12 simultaneously performs detection and error-correction in order to increase immunity from random noise which may be produced on the channel.

The symbol data detected in TCM decoder 12 passes through data deinterleaver 13 and R-S decoder 14. In these circuits, burst errors which are not corrected in TCM decoder 12 and appear in groups due to the large volume of random noise are corrected.

The data error-canceled through data deinterleaver 13 and R-S decoder 14 is restored to the original data in data derandomer 15, and input to the video and audio decoder terminals.

In other words, since data in a predetermined pattern affects the performance of sync extractor 5 and channel equalizer 9, the data is randomized on the transmission side and restored to the original form in data derandomer 15.

Referring to FIG. 2, the conventional cable broadcasting receiver for HDTV comprises an antenna 20, tuner 21, channel selector 22, IF filter/sync detector 23, sync extractor 24, channel equalizer 25, phase tracker 26, discriminator 27, data deinterleaver 28, R-S decoder 30, and data derandomer 31.

Since HDTV cable broadcasting has no NTSC interference and very little random noise, the HDTV cable broadcasting receiver does not require NTSC rejection filter 6 used in the HDTV terrestrial broadcasting receiver. In addition, TCM decoder 12 used in the HDTV terrestrial broadcasting receiver may be replaced with simple discriminator 27. Since NTSC rejection filter 6 is not used, NTSC interference discriminator 8 and multiplexer 9 are used, neither.

In the cable broadcasting, two programs are transmitted in one band so that selection of one between two programs is necessary along with tuning. This function is performed in data deinterleaver 29, requiring no additional component in the HDTV cable broadcasting receiver.

The operation of the HDTV cable broadcasting receiver constructed as above will be described below.

A signal input via antenna 20 is converted into an IF signal in tuner 21 according to a channel selected by channel selector 22.

The thus converted IF signal is changed into a form suitable for detection in IF filter/sync detector 23, and becomes a baseband signal. In sync detection, a carrier extracted in sync extractor 24 is used.

The baseband signal output from IF filter/sync detector 23 is channel-equalized in channel equalizer 25 in order to cancel ghost error. A phase which may deviate slightly in restoring the carrier for sync detection of sync detector 24 is finely adjusted in phase tracker 26. Since cable broadcasting has less ghost error caused in multipath, unlike terrestrial broadcasting, channel equalizer 25 which contains a small number of filter taps is used.

After the phase tracking, the baseband signal output from phase tracker 26 is symbol-detected through discriminator 27. In cable broadcasting random noise which may be created on the channel is very little so that simple discriminator 27 can be only used instead of the TCM decoder.

The symbol data detected in discriminator 27 passes through data deinterleaver 28 and R-S decoder 30. In these circuits, burst errors which are not corrected in discriminator 27 and appear in groups due to the large volume of random noise are corrected. At the same time, out of two programs transmitted from one band by channel selector 22, one program is selected in data deinterleaver 28.

The data error-canceled through data deinterleaver 28 and R-S decoder 30 is combined to the original data in data derandomer 31, and input to the video and audio decoder terminals.

In order to receive both the HDTV terrestrial broadcasting and cable broadcasting, terrestrial broadcasting receiver and cable broadcasting receiver both are required in the conventional system.

SUMMARY OF THE INVENTION

Therefore, in order to overcome such a drawback, it is an object of the present invention to provide an HDTV terrestrial/cable broadcasting receiver for commonly receiving terrestrial broadcasting and cable broadcasting for HDTV by using a switch in a single receiver.

To accomplish the object of the present invention, there is provided a terrestrial/cable broadcasting receiver for an HDTV for receiving both terrestrial and cable channel broadcastings of an HDTV comprising: switching means for selecting terrestrial broadcasting or cable broadcasting; a TCM decoder for symbol-detecting and error-correcting the baseband signal of the HDTV terrestrial broadcasting; discriminating means for symbol-detecting a baseband signal of the HDTV cable broadcasting; and a multiplexer for selecting and outputting one of the signals output from the TCM decoder and the discriminating means according to the switching means.

For another embodiment of the present invention, there is provided a terrestrial/cable broadcasting receiver for an HDTV for receiving both terrestrial and cable channel broadcastings of an HDTV comprising: first switching means for selecting terrestrial broadcasting or cable broadcasting; a channel selector for selecting channels for the terrestrial and cable broadcastings; a channel equalizer for channel-equalizing the baseband signal received, filtered and detected in the channel selector according to a selected channel, and outputting from the first switching means, by changing the number of filter taps for the purpose of canceling ghost error; a phase tracker for finely adjusting the phase of the baseband signal output from the channel equalizer according to the switching means; a TCM decoder for symbol-detecting and error-correcting the baseband signal output from the phase tracker; discriminating means for symbol-detecting the signal output from the phase tracker; a first multiplexer for selecting and outputting one of the signals output from the TCM decoder and the discriminating means according to the first switching means; a data deinterleaver for reversely interpolating the signal output from the first multiplexer according to the first switching means and channel selector; a R-S decoder for R-S decoding the signal output from the data deinterleaver; and a data derandomer for combining the data output from the R-S decoder into the original data.

BRIEF DESCRIPTION OF THE ATTACHED DRAWINGS

DETAILED DESCRIPTION OF THE INVENTION

Hereinafter, a preferred embodiment of the present invention will be described below with reference to the attached drawings.

Figure 3:
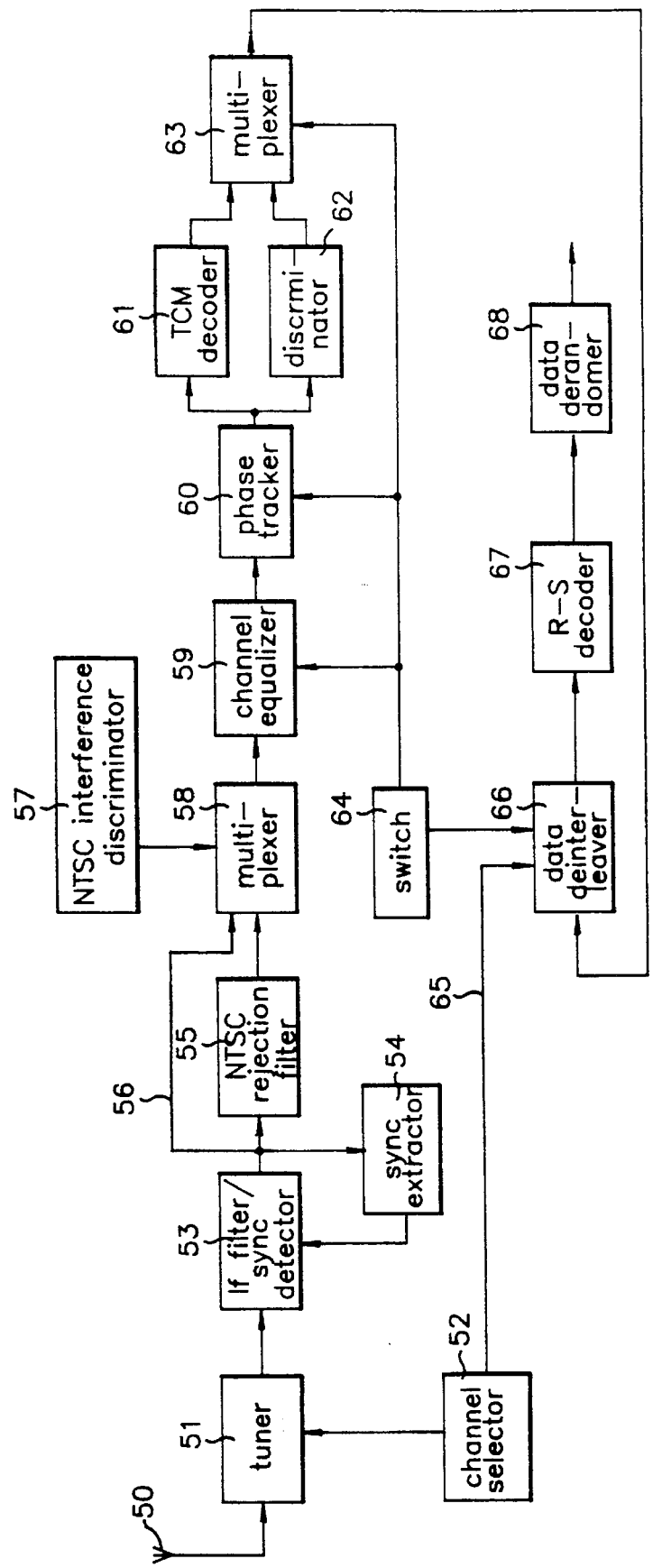
FIG. 3 is a block diagram of a terrestrial/cable broadcasting signal receiver of an HDTV of the present invention.

Referring to FIG. 3, an HDTV terrestrial/cable broadcasting receiver of the present invention comprises an antenna 50, tuner 51, channel selector 52, IF filter/sync detector 53, sync extractor 54, NTSC rejection filter 55, NTSC interference discriminator 57, multiplexers 58 and 63, channel equalizer 59, phase tracker 60, TCM decoder 61, discriminator 62, switch 64, data deinterleaver 66, R-S decoder 67, and data derandomer 68.

Figure 1:
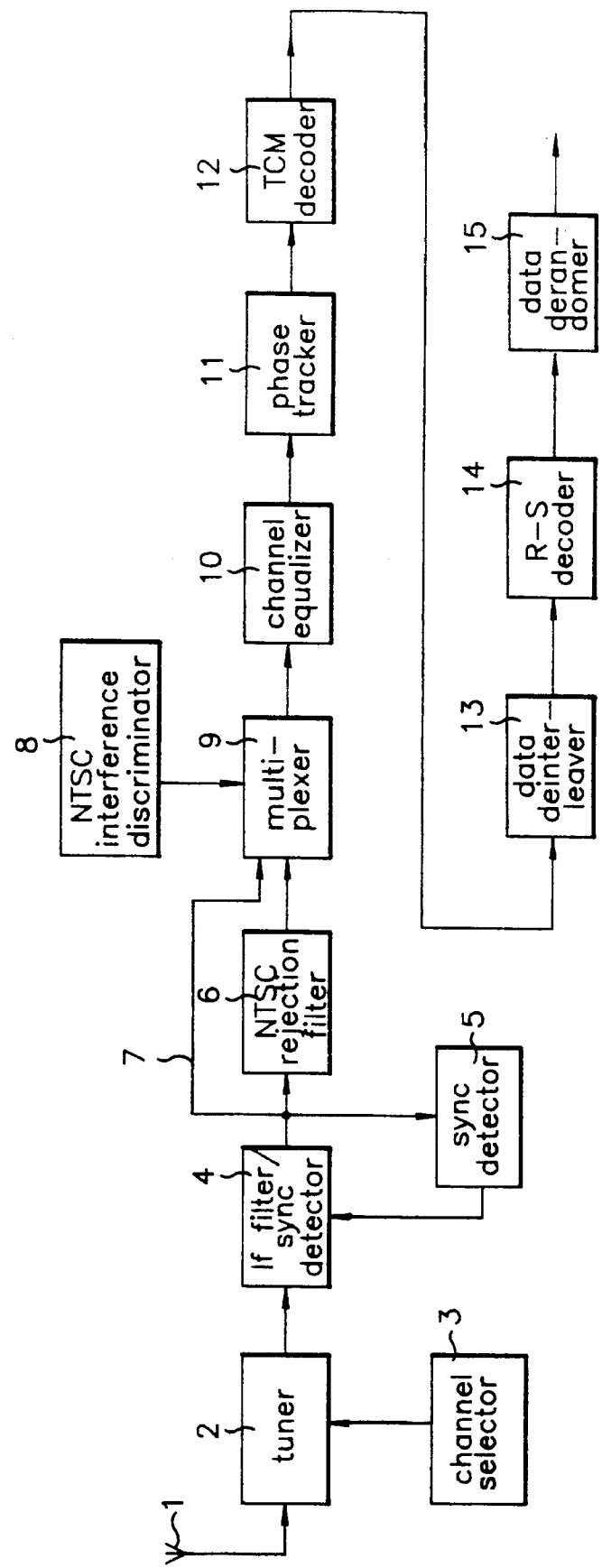
FIG. 1 is a block diagram of a terrestrial broadcasting receiver for a general HDTV.
Figure 2:
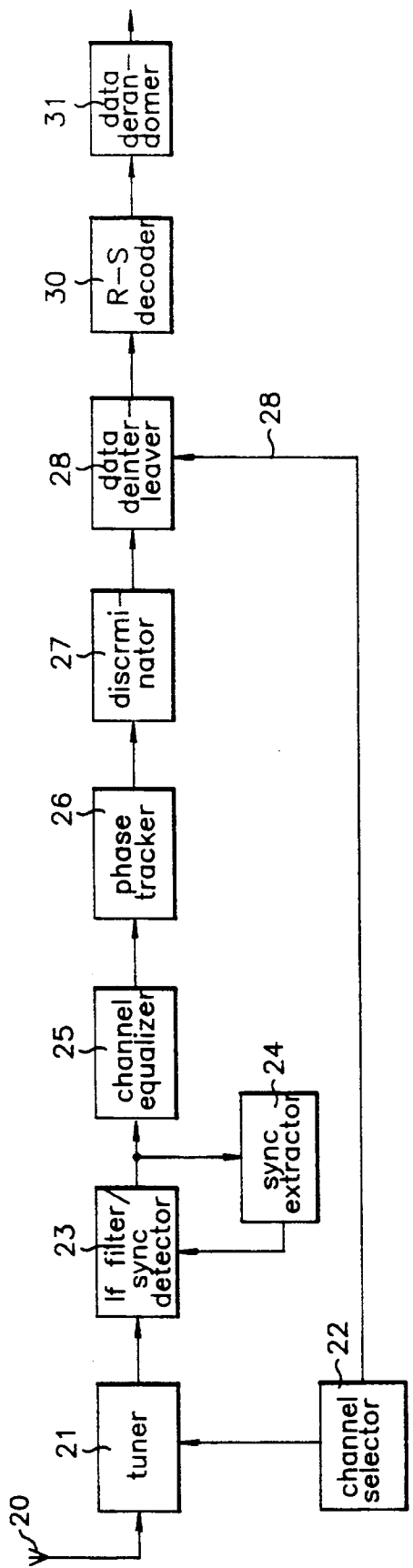
FIG. 2 is a block diagram of a cable broadcasting receiver for a general HDTV.

The terrestrial/cable broadcasting receiver for the present invention is constructed to further comprise discriminator 62, switch 64 and multiplexer 63 in addition to the components of the HDTV terrestrial broadcasting receiver of FIG. 1.

Antenna 50 receives terrestrial and cable receiving signals to be transmitted. Channel selector 52 selects channels for the terrestrial and cable broadcasting signals.

Tuner 51 selects a signal received through antenna 50 under the control of channel selector 52, and converts the received signal into an IF signal.

IF filter/sync detector 53 sync-detects the IF signal output from tuner 51 by using a carrier output from sync extractor 54, and converts the sync-detected signal into a baseband signal. Sync extractor 54 extracts the carrier by using the baseband signal output from IF filter/sync detector 53, and outputs the extracted carrier to IF filter/sync detector 53.

NTSC rejection filter 55 cancels NTSC interference from the baseband signal output from IF filter/sync detector 53. NTSC interference discriminator 57 discriminates the presence or absence of the NTSC interference so as to control multiplexer 58.

Multiplexer 58 selects one of the signals output from IF filter/sync detector 53 and NTSC rejection filter 55 under the control of NTSC interference discriminator 57, and outputs the selected signal to channel equalizer 59.

Switch 64 is for a user to select the reception of terrestrial broadcasting or cable broadcasting. The switch selects terrestrial broadcasting or cable broadcasting to control the system.

Channel equalizer 59 channel-equalizes the baseband signal received, filtered and detected in channel selector 52 according to a selected channel, and output from multiplexer 58 under the control of switch 64, by changing the number of filter taps. This cancels ghost error.

Phase tracker 60 finely adjusts the phase of the baseband signal output from channel equalizer 59 according to the control of switch 64. Phase tracker 60 requires an error signal in order to obtain a control signal in accordance with phase variation. The error signal indicates the difference signal between data which discriminates symbol and data which does not. The symbol may be discriminated differently according to the number of level used for every symbol. The phase tracker operates differently depending on the terrestrial or cable broadcasting.

In other words, terrestrial broadcasting uses 8 VSB, with the cable broadcasting using 16 VSB. The terrestrial broadcasting has 8 levels for every symbol. The cable broadcasting has 16 levels for every symbol. This makes the discrimination of the error signal different for respective broadcastings.

TCM decoder 61 is designed to increase immunity from random noise which may be generated on the channel. The TCM decoder symbol-detects and error-corrects the baseband signal of the terrestrial broadcasting output from phase tracker 60.

Discriminator 62 symbol-detects the baseband signal of the cable broadcasting output from phase tracker 60.

Multiplexer 63 selects one of the signals output from TCM decoder 61 and discriminator 62 according to the control of switch 64.

Data deinterleaver 66 reversely interpolates data output from multiplexer 63 under the control of switch 64 and channel selector 52. R-S decoder 67 R-S decodes the data output from data deinterleaver 66.

Data derandomer 68 combines the data output from R-S decoder 67 into the original data, and outputs the result to the video and audio decoders.

The operation of the terrestrial/cable broadcasting receiver for HDTV of the present invention will be explained below.

First, a user determines whether to receive terrestrial broadcasting or cable broadcasting through switch 64. Channel selector 52 selects a channel to receive through.

A signal input through antenna 50 is tuned and converted into an IF signal in tuner 51 according to the channel selected in channel selector 52. The converted signal is changed into a form suitable for detection in IF filter/sync detector 53, and converted into a baseband signal.

The baseband signal output from IF filter/sync detector 53 is carrier-extracted in sync extractor 54, and output to IF filter/sync detector 53 for use in If filter/sync detector 53's sync detection.

The baseband signal output from IF filter/sync detector 53 passes through NTSC rejection filter 55 when NTSC interference discriminator 8 detects that there is NTSC interference. When there is no NTSC interference, the baseband signal is directly output through path 56 not via NTSC rejection filter 55. For this selection, multiplexer 58 is used. More specifically, multiplexer 58 selects path 56 when NTSC interference discriminator 57 discriminates that there is no NTSC interference, and outputs the signal output from IF filter/sync detector 53 to channel equalizer 59. When it is determined that there is NTSC interference, the signal output from NTSC rejection filter 55 is selected and output from IF filter/sync detector 53. A signal in which the NTSC interference is canceled in NTSC rejection filter 55 is output to channel equalizer 59. However, cable broadcasting has no NTSC interference so that it is always determined that there is no NTSC interference.

The ghost error of the signal selected and output from multiplexer 58 is canceled in channel equalizer 59 under the control of switch 64. The number of filter taps is varied according to terrestrial or cable broadcasting selected by switch 64.

In the terrestrial broadcasting the number of filter taps must be increased even though the convergence time of channel equalizer 59 is lengthened, because a lot of ghost error of a long delay time created due to multipath is produced. In the cable broadcasting a lot of the ghost error of a long delay time is not generated, reducing the number of filter taps of channel equalizer 59. This shortens convergence time.

The baseband signal output from channel equalizer 59 is finely adjusted in its phase by phase tracker 60 under the control of switch 64.

The baseband signal output from phase tracker 60 is symbol-detected through TCM decoder 61 and discriminator 62, and selected and output through multiplexer 63 under the control of switch 64.

If switch 64 selects terrestrial broadcasting, since there is a lot of random noise, multiplexer 63 selects the output signal of TCM decoder for performing symbol detection and error correction under the control of switch 64. If switch 64 selects cable broadcasting, since there is little random noise, multiplexer 63 selects the output signal of discriminator 62 for performing only symbol detection under the control of switch 64.

In other words, in the terrestrial broadcasting, the signal output from phase tracker 60 and symbol-detected and error-corrected in TCM decoder 61 is selected in multiplexer 63 and output to data deinterleaver 66. In the cable broadcasting, the signal output from phase tracker 60 and symbol-detected in discriminator 62 is selected by multiplexer 63 and output to data deinterleaver 62.

The symbol data symbol-detected and output from multiplexer 63 is reversely interpolated in data deinterleaver 66 under the control of switch 64 and channel selector 52, and R-S decoded in R-S decoder 67. In this circuit, burst errors which are not corrected in TCM decoder 61 and discriminator 62 and appear in groups due to the large volume of random noise are corrected.

Here, if switch 64 selects cable broadcasting, one of two programs is selected and reversely interpolated according to the signal output from data deinterleaver 66 to channel selector 52. If switch 64 selects ground broadcasting, the function to select one of the two programs is removed from data deinterleaver 66, and the signal output from multiplexer 63 is reversely interpolated and output to R-S decoder 67.

The data output from R-S decoder 67 is combined to the original data in data derandomer 68, and output to the video and audio decoders.

Signal path varied by user's selection of terrestrial or cable broadcasting will be explained in more detail.

When the user selects terrestrial broadcasting through switch 64, a transmitted signal is output via antenna 50, tuner 51, IF filter/sync detector 53, NTSC rejection filter 55, multiplexer 58, channel equalizer 59 of many number of taps, phase tracker 60 of 8 VSB, TCM decoder 61, multiplexer 63, data deinterleaver 66 requiring no channel selection, R-S decoder 67, and data derandomer 68.

When the user selects cable broadcasting through switch 64, a transmitted signal is output via antenna 50, tuner 51, IF filter/sync detector 53, multiplexer 58, channel equalizer 59 of few number of taps, phase tracker 60 of 16 VSB, discriminator 62, multiplexer 63, data deinterleaver 66 requiring channel selection by channel selector 52, R-S decoder 67, and data derandomer 68.

Figure 4:
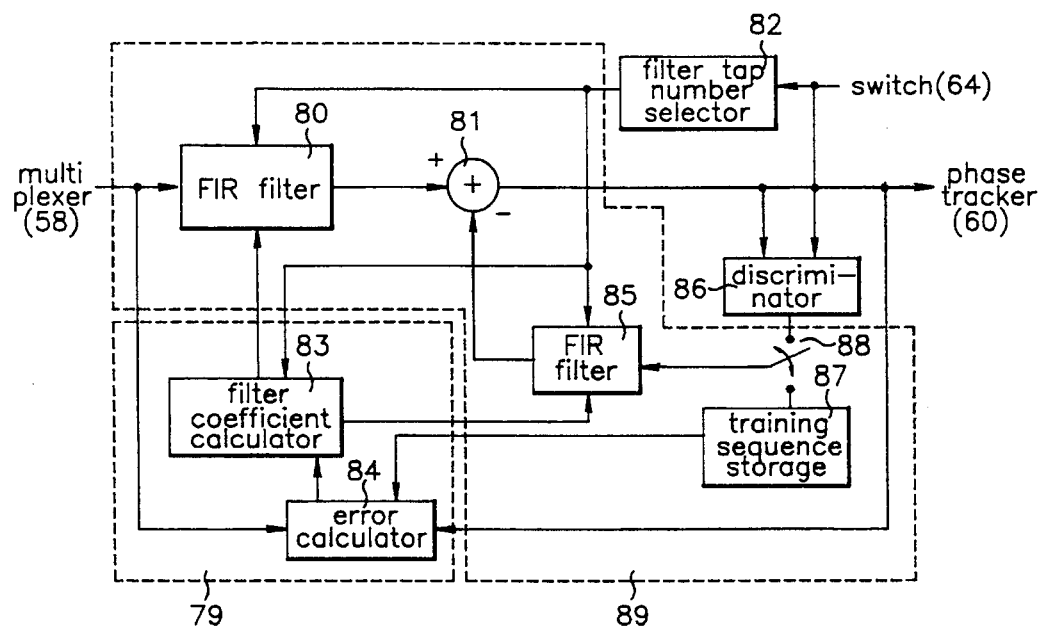
FIG. 4 is a detailed block diagram of the channel equalizer shown in FIG. 3.

Referring to FIG. 4, channel equalizer 59 is comprised of a filter tap number selector 82, discriminator 86, coefficient calculator 79, and filter portion 89.

Filter portion 89 comprises a training sequence storage 87 for storing a training sequence signal transmitted from a transmitter in order to enable a receiver to compensate for errors which may be generated during the transmission of signal, an FIR filter 80 for FIR-filtering the signal output from multiplexer 58 by using a filter coefficient output from coefficient calculator 79 under the control of filter tap number selector 82, a switch 88 for selecting one of the output signals of discriminator 86 and training sequence storage 87, an FIR filter 85 for FIR-filtering the signal selected and output by switch 88 by using the filter coefficient output from coefficient calculator 79 under the control of filter tap number selector 82, and a subtractor 81 for subtracting the signal output from FIR filter 85 from the signal output from FIR filter 80, and outputting the subtracted signal to phase tracker 60 and discriminator 86. The filter portion filters the signal output from multiplexer 58 under the control of filter tap number selector 82.

In other words, filter portion 89 cancels ghost error from the baseband signal output from multiplexer 58 by using the signal output from discriminator 86 under the control of filter tap number selector 82.

Switch 88 of filter portion 89 outputs the signal output from discriminator 86 and training sequence storage 87 to FIR filter 85. When a training sequence is input from multiplexer 58, the training sequence output from training sequence storage 87 is selected and output to FIR filter 85. The filtering of the training sequence is finished, the signal output from discriminator 86 is selected and output to FIR filter 85.

Filter tap number selector 82 selects the number of filter taps according to switch 64. When terrestrial broadcasting is selected according to switch 64, filter tap number selector 82 makes FIR filters 80 and 85 operate in the direction of increasing the number of filter taps. If cable broadcasting is selected, filter portion 89 is controlled to operate FIR filters 80 and 85 in the direction of decreasing the number of filter taps.

Coefficient calculator 79 comprises an error calculator 84 for calculating an error by using the signals output from subtractor 81, training sequence storage 87 and multiplexer 58 of filter portion 89, and a filter coefficient calculator 83 for calculating a filter coefficient according to filter tap number selector 82 and error calculator 84, and outputting the result to FIR filter 80 of filter portion 89. The coefficient calculator calculates the filter coefficient by using the signals output from filter portion 89 and multiplexer 58 according to filter tap number selector 82, and outputs the result to filter portion 89.

Here, when fewer number of taps is selected in filter tap number selector 82, filter coefficient calculator 83 calculates the filter coefficient in accordance with the number of filter taps and with the output signal of error calculator 84. The result is output to FIR filters 80 and 85. If more number of filter taps is selected in filter tap number selector 82, the filter coefficient is calculated in accordance with the number of filter taps and with the output signal of error calculator 84, and output to filters 80 and 85.

Discriminator 86 symbol-detects the signal output from filter portion 89 according to switch 64, and outputs the result to filter portion 89.

Here, discriminator 86 can be constructed with a ROM. Therefore, when switching is performed to vary the output data of the ROM, the discriminator is used in both terrestrial and cable broadcastings.

If the level number for every symbol is for terrestrial broadcasting, discriminator 86 is 8 VSB. In cable broadcasting the discriminator is 16 VSB. According to the selection of switch 64, the signal output from subtractor 81 is symbol-detected to vary the level number for every symbol. The symbol-detected signal is output and filtered in FIR filter 85.

A case in which channel equalizer 59 channel-equalizes the ground broadcasting will be explained below.

When switch 64 selects terrestrial broadcasting, filter tap number selector 82 operates FIR filters 80 and 85 so that they have more number of filter taps. The filter coefficient is calculated in filter coefficient calculator 83.

The training sequence stored in training sequence storage 87 is input in error calculator 84 along with the training sequence signal output from multiplexer 58 for the purpose of error calculation. The calculated error value is input to filter coefficient calculator 83 and used in calculating the filter coefficient required in FIR filters 80 and 85 according to filter tap number selector 82.

The filter coefficient calculated in filter tap number calculator 83 is input to FIR filters 80 and 85 and used in filtering.

The signal output from multiplexer 58 is FIR-filtered in FIR filter 80 according to the filter coefficient of filter coefficient calculator 83. The signal output from training sequence storage 87 is FIR-filtered in FIR filter 85 according to the filter coefficient of filter coefficient calculator 83, and subtracted in subtractor 81.

The signal output from subtractor 81 is symbol-detected in discriminator 86 in accordance with 8 VSB under the control of switch 64, and input to FIR filter 85 according to switch 88.

According to the filter coefficient continuously output from filter coefficient calculator 83, the signal output from discriminator 86 is FIR-filtered in. FIR filter 85. The signal output from multiplexer 58 is also FIR-filtered in FIR filter 80, subtracted in subtractor 81, and continuously output to phase tracker 60.

When the training sequence is input from multiplexer 58, switch 88 is switched to input the signal to error calculator 84 along with the training sequence stored in training sequence storage 87. After that, the signal is error-calculated to be used in calculation of the filter coefficient of filter coefficient calculator 83.

When the filter coefficient is output, the FIR-filtering process is repeated by using the training sequence signal stored in training sequence storage 87.

As switch 64 selects cable broadcasting, filter tap number selector 82 operate FIR filters 80 and 85 so that they have the minimum number of taps within a range in which the performance of the filter is not affected. The filter coefficient is calculated in filter coefficient calculator 83. Discriminator 86 performs symbol-detection with the level number used for every symbol being 16 VSB. Here, the components of channel equalizer 59 excluding filter tap number selector 82, filter coefficient calculator 83, FIR filters 80 and 85, and discriminator 86 operate in the same manner as in a case when the terrestrial broadcasting is selected.

Figure 5:
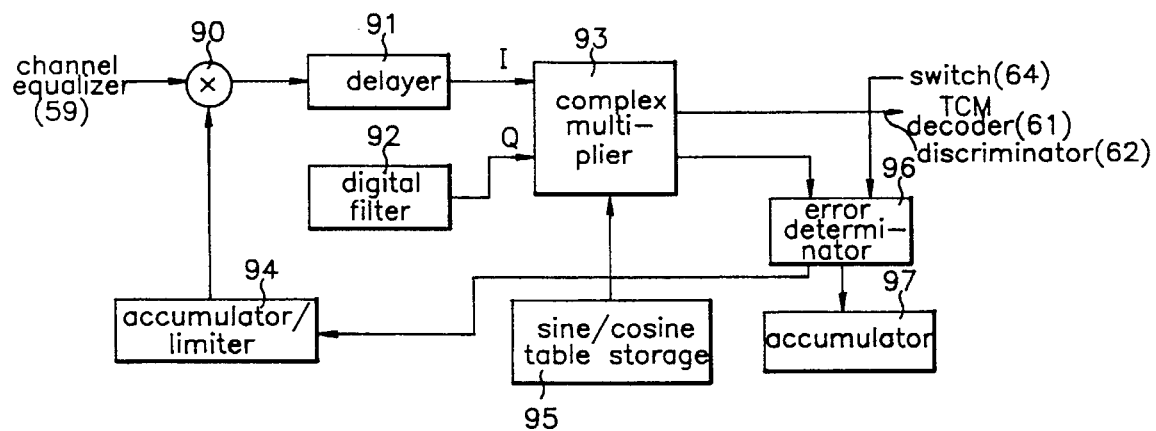
FIG. 5 is a detailed block diagram of the phase tracker of FIG. 3.

Referring to FIG. 5, phase tracker 60 comprises a multiplier 90, delayer 91, digital filter 92, complex multiplier 93, accumulator/limiter 94, sine/cosine table storage 95, accumulator 97, and error determinator 96.

Error determinator 96 calculates the phase and gain error by using the signal output from complex multiplier 93 according to switch 64.

In order to obtain a control signal in accordance with phase variation in phase tracker 60, an error signal is required. Error determinator 96 obtains a phase error signal and gain error signal indicative of the difference between data which discriminates a symbol and data which does not.

In other words, for the configuration of error determinator 96, a symbol discriminator is necessary. According to this, cases are different in terrestrial broadcasting and cable broadcasting. For the calculation of phase and gain error, the cases are divided into two cases in which the level number for every symbol is 8 VSB or 16 VSB.

Accumulator 97 accumulates the phase error signal output from error determinator 96.

Sine/cosine table storage 95 stores a sine/cosine table, and outputs a sine/cosine value for varying phase in accordance with the signal output from accumulator 97.

Accumulator/limiter 94 accumulates and limits the gain error signal output from error determinator 96.

Multiplier 90 multiplies the signal output from accumulator/limiter 94 by the signal output from channel equalizer 59.

Delayer 91 delays the signal output from multiplier 90 and outputs I value.

Digital filter 92 digitally filters the signal output from multiplier 90, and outputs Q value.

complex multiplier 93 complex-multiplies I value and Q value output from delayer 91 and digital filter 92 according to the sine/cosine value output from sine/cosine table storage 95 for the purpose of varying the phase. The multiplied signal is output to TCM decoder 61, discriminator 62, and error determinator 96.

The operation of phase tracker 60 constructed as above will be described below.

When the user selects the reception of terrestrial broadcasting, a case in which the level number for every symbol is 8 VSB is selected by switch 64, and error determinator 96 calculates a phase/gain error signal indicative of the difference between data which discriminates a symbol with 8 VSB in the symbol discriminator and data which does not.

When the user selects the reception of cable broadcasting, a case in which the level number for every symbol is 16 VSB is selected by switch 64, and error determinator 96 calculates a phase/gain error signal indicative of the difference between data which discriminates a symbol with 16 VSB in the symbol discriminator and data which does not.

The phase error signal calculated in error determinator 96 is accumulated in accumulator 97, and then input to sine/cosine table storage 95. This is used in outputting a sine/cosine value for varying the phase.

The gain error signal output from error determinator 96 is accumulated and limited in accumulator/limiter 94, and output to multiplier 90. The signal output from accumulator/limiter 94 is multiplied by the signal output from channel equalizer 59 in multiplier 90. The result is output to delayer 91 and digital filter 92.

The signal output from multiplier 90 is delayed in delayer 91 to be output as I value, and digitally filtered in digital filter 92 to be output as Q value.

I and Q values output from delayer 91 and digital filter 92 are complex-multiplied in complex multiplier 93 along with the sine/cosine value output from sine/cosine filter 95 for the purpose of phase variation. The result is output to TCM decoder 61 and discriminator 62.

The signal output from complex multiplier 93 is input to error determinator 96 to repeat the above-explained process so that the phase of the signal output from channel equalizer 59 is tracked and adjusted.

As described above, in the present invention the terrestrial broadcasting receiver and cable broadcasting receiver are coupled to form a single receiver. This reduces the production cost.

What is claimed is:

1. A terrestrial/cable broadcasting receiver for an HDTV for receiving both terrestrial and cable channel broadcastings of an HDTV comprising:

a switching means for selecting terrestrial broadcasting or cable broadcasting;

a channel equalizer for increasing the number of filter taps when said switching means selects terrestrial broadcasting and decreasing the number of filter taps when said switching means selects cable broadcasting;

a phase tracker for calculating a phase and error signal inputted from said channel equalizer with 8 VSB symbol level when said switching means selects terrestrial broadcasting and calculating a phase and error signal inputted from said channel equalizer with 16 VSB symbol level when said switching means selects cable broadcasting;

a TCM decoder for symbol-detecting and error-correcting a baseband signal of the terrestrial broadcasting for HDTV;

a discriminating means for symbol-detecting a baseband signal of the HDTV cable broadcasting; and a multiplexer for selecting and outputting one of the signals output from said TCM decoder and said discriminating means according to said switching means.

2. A terrestrial/cable broadcasting receiver for an HDTV for receiving both terrestrial and cable channel broadcastings of an HDTV comprising:

a first switching means for selecting terrestrial broadcasting or cable broadcasting;

a channel selector for selecting channels for said terrestrial and cable broadcastings;

a channel equalizer for increasing the number of filter taps when said switching means selects terrestrial broadcasting and decreasing the number of filter taps when said switching means selects cable broadcasting;

a phase tracker for calculating a phase and error signal inputted from said channel equalizer with 8 VSB symbol level when said switching means selects terrestrial broadcasting and calculating a phase and error signal inputted from said channel equalizer with 16 VSB symbol level when said switching means selects cable broadcasting;

a TCM decoder for symbol-detecting and error-correcting the baseband signal output from said phase tracker;

a discriminating means for symbol-detecting the signal output from said phase tracker;

a first multiplexer for selecting and outputting one of the signals output from said TCM decoder and said discriminating means according to said first switching means;

a data deinterleaver for reversely interpolating the signal output from said first multiplexer according to said first switching means and channel selector;

a R-S decoder for R-S decoding the signal output from said data deinterleaver; and a data derandomer for combining the data output from said R-S decoder into the original data.

3. A terrestrial/cable broadcasting receiver as claimed in claim 2, further comprising:

a tuner for selecting a signal received through an antenna according to said channel selector, and converting the received signal into an IF signal;

an IF filter/sync detector for sync-detecting the IF signal output from said tuner, and converting the sync-detected signal into a baseband signal;

a sync extractor for extracting a carrier by using the baseband signal output from said IF filter/sync detector, and outputting the extracted carrier to said IF filter/sync detector;

an NTSC rejection filter for canceling NTSC interference from the baseband signal output from said IF filter/sync detector;

an NTSC interference discriminator for discriminating the presence or absence of the NTSC interference;

a second multiplexer for selecting one of the signals output from said IF filter/sync detector and NTSC rejection filter according to said NTSC interference discriminator, and outputting the selected signal to said channel equalizer.

4. A terrestrial/cable broadcasting receiver as claimed in claim 3, wherein said channel equalizer comprises:

a filter tap number selector for selecting the number of filter taps according to said first switching means;

a filtering means for filtering the signal output from said second multiplexer according to said filter tap number selector;

a coefficient calculating means for calculating a filter coefficient by using the signals output from said filtering means and second multiplexer according to said filter tap number selector, and outputting the result to said filtering means; and a discriminator for symbol-detecting the signal output from said filtering means according to said first switching means, and outputting the result to said filtering means.

5. A terrestrial/cable broadcasting receiver as claimed in claim 4, wherein said filtering means comprises:

a training sequence storage for storing a training sequence signal transmitted from a transmitter in order to enable a receiver to compensate for errors which may be generated during the transmission signal;

a first FIR filter for FIR-filtering the signal output from said second multiplexer by using a filter coefficient output from said coefficient calculator according to said filter tap number selector;

a second switching means for selecting one of the output signals of said discriminator and training sequence storage;

a second FIR filter for FIR-filtering the signal selected and output by said second switching means by using the filter coefficient output from said coefficient calculator according to said filter tap number selector; and a subtractor for subtracting the signals output from said first and second FIR filters, and outputting the subtracted signal to said phase tracker and discriminator.

6. A terrestrial/cable broadcasting receiver as claimed in claim 4, wherein said coefficient calculator comprises:

an error calculator for calculating an error by using the signals output from said filtering means and second multiplexer; and a filter coefficient calculator for calculating a filter coefficient according to said filter tap number selector and error calculator, and outputting the result to said filtering means.

7. A terrestrial/cable broadcasting receiver as claimed in claim 3, wherein said phase tracker comprises:

an error determinator for calculating an error according to said first switching means, and outputting phase and gain error signals;

an accumulator for accumulating the phase error signal output form said error determinator;

a sine/cosine table storage for storing a sine/cosine table, and outputting a sine/cosine value for varying phase in accordance with the signal output from said accumulator;

an accumulator/limiter for accumulating and limiting the gain error signal output from said error determinator;

a multiplier for multiplying the signal output from said channel equalizer and accumulator/limiter;

a delayer for delaying the signal output from said multiplier and outputting I value;

a digital filter for digitally filtering the signal output from said multiplier, and outputting Q value; and a complex multiplier for complex-multiplying I value and Q value output from said delayer and digital filter according to the sine/cosine value output from said sine/cosine table storage, and outputting to said TCM decoder, discriminator, and error determinator.

8. A method for receiving both terrestrial and cable HDTV broadcasting comprising the steps of:

selecting terrestrial or cable HDTV broadcasting;

increasing the number of filter taps when terrestrial broadcasting is selected and decreasing the number of filter taps when cable broadcasting is selected; and calculating a phase and error signal inputted from the channel equalizing step with 8VSB symbol level when terrestrial broadcasting is selected, and calculating a phase and error signal inputted from the channel equalizing step with 16 VSB symbol level when cable broadcasting is selected.

* * * * *